United States Patent [19]

Raley

[11] 3,837,773

[45] Sept. 24, 1974

[54] EXTRUDED PLASTIC FILM METHOD AND APPARATUS FOR THE MANUFACTURE THEREOF

[75] Inventor: Garland E. Raley, Morris Plains, N.Y.

[73] Assignee: Ethyl Corporation, Richmond, Va.

[22] Filed: Mar. 27, 1969

[21] Appl. No.: 834,920

Related U.S. Application Data

[62] Division of Ser. No. 508,424, Nov. 18, 1965, abandoned.

[52] U.S. Cl.................. 425/131, 425/462, 425/466, 264/95, 264/173, 264/209, 264/245
[51] Int. Cl.......................... B29d 23/04, B29f 3/12
[58] Field of Search............ 264/173, 171, 95, 209, 264/75, 245; 425/130, 131, 133, 460–463, 466, 378, 71

[56] References Cited
UNITED STATES PATENTS

| 2,141,776 | 12/1938 | Vautier et al............ 264/173 |
|---|---|---|
| 2,227,682 | 1/1941 | Wade.................. 264/173 |
| 2,709,834 | 6/1955 | Johnson............... 425/131 |
| 2,809,393 | 10/1957 | Hauptman............ 425/131 |
| 3,097,058 | 7/1963 | Branscum et al...... 264/245 |
| 3,143,583 | 8/1964 | Haugwitz............. 264/245 |
| 3,334,168 | 8/1967 | Majewski et al....... 264/173 |
| 3,372,920 | 3/1968 | Corbett et al......... 264/173 |

OTHER PUBLICATIONS

Fisher, Extrusion of Plastic, June 1964, pp. 177–180, New York Interscience Publishers, TP 986A2F-56-1964.

Primary Examiner—Jeffery R. Thurlow
Attorney, Agent, or Firm—Donald L. Johnson; John F. Sieberth; E. Donald Mays

[57] ABSTRACT

This invention relates to extruding thermoplastic materials. More particularly, the invention relates to a new extruded seamless lay-flat blown tubing, to an apparatus and a method for the manufacture thereof.

1 Claim, 5 Drawing Figures

EXTRUDED PLASTIC FILM METHOD AND APPARATUS FOR THE MANUFACTURE THEREOF

This application is a division of application Ser. No. 508,424, filed Nov. 18, 1965, now abandoned.

A substantial amount of commercially produced thermoplastic film is prepared by the "blown tube method" wherein a thermoplastic composition is melted and extruded through an annular orifice in the form of a seamless tubing. As the tubing is withdrawn from the die and while it is still in the plastic formative state, it is inflated to a predetermined diameter, thereby biaxially orienting the film. Generally, a stream of air is directed against the film adjacent the extrusion die or other heat transfer means is used to solidify the molten film. After the tubing has set, it is collapsed by a pair of nip rollers and wound up on a mandrel. If it is desired to prepare flat sheeting from the blown tubing, the tube is split longitudinally and rolled in the flat sheet state.

Most blown tubing manufactured is transparent. When the tubing is used for overwrap and for forming bags or sacks and other packaging uses, the material may be printed by conventional offset or lithographic printing means. However, it is occasionally desired to provide a plastic film having a color agent added thereto. Colored plastic film is conventionally formed by mixing the color agent into the plastic material prior to extrusion and then extruding the molten plastic through an annular die to form the colored blown tubing. There has been a need for a colored or opaque blown thermoplastic tubing film which can be fabricated into bags or containers for merchandising commodities wherein the bag or container would have a longitudinal transparent strip, or clear window area, through which the commodities or packaged material could be easily seen. Although printed or colored plastic packaging material is often preferred because of enhanced sales appeal, it is sometimes unsuitable for use in packaging an article because it does not permit the customer to view the article packaged through the bag itself.

It is an object of this invention to provide a seamless, tubular, thermoplastic film having a longitudinally extending transparent band extending the full length of the film.

It is also an object of this invention to provide a seamless, tubular, thermoplastic film having two separate wall areas, which areas have different optical characteristics.

It is another object of this invention to provide a novel die construction which permits the production of a seamless, tubular, thermoplastic film having wall areas of different optical properties.

It is another object of the present invention to provide a method of producing a seamless, tubular, thermoplastic film having optically different wall areas.

Other additional objects will appear hereinafter.

The foregoing object relating to the thermoplastic film is realized in the film of the present invention which is an integral, blown, seamless, tubular thermoplastic film characterized in that the film has an integrally formed, longitudinally extending, substantially transparent band extending the full length of the film. The remaining portion of the film is substantially opaque.

The object of the invention relating to the method of producing the film of the present invention is achieved by injecting a first molten thermoplastic material into a portion of the annular space provided in a cylindrical extrusion die. A second molten thermoplastic stream is also injected. The second stream has optical characteristics which are different from the first stream of plastic material. The second stream is injected into the remaining portion of the annular space in the cylindrical die. The first thermoplastic material and the second thermoplastic material are extruded at the same rate of flow under substantially laminar flow conditions to provide optically sharp lines of demarcation between the portions of the film produced from the first and the second thermoplastic materials.

The objectives of the invention relating to the novel die for melt extruding the thermoplastic material is realized in a die having a ring-shaped base section. A hollow cylindrical core section concentrically removably mounted on the upper surface of the base section is provided. A ring-shaped outer die lip section is removably mounted on the upper surface of the base section and surrounds a portion of core section. The outer die lip section has a wall spaced from the outer wall of the core section to define an annular passage terminating in a die orifice through which the tubular thermoplastic material is extruded. A ring-shaped passage is provided between a portion of the bottom wall of the outer die lip section and a portion of the upper surface of the base section. The passage communicates with the annular passage as described above. The base section is provided with two inlet ports spaced about 180° apart. The ports communicate with the ring-shaped passage defined hereinbefore whereby separate streams of molten thermoplastic material may be simultaneously fed to the die.

Other objects, advantages and features of the invention will be apparent from a reading of the following description when taken in conjunction with the accompanying drawings.

Figure 1:
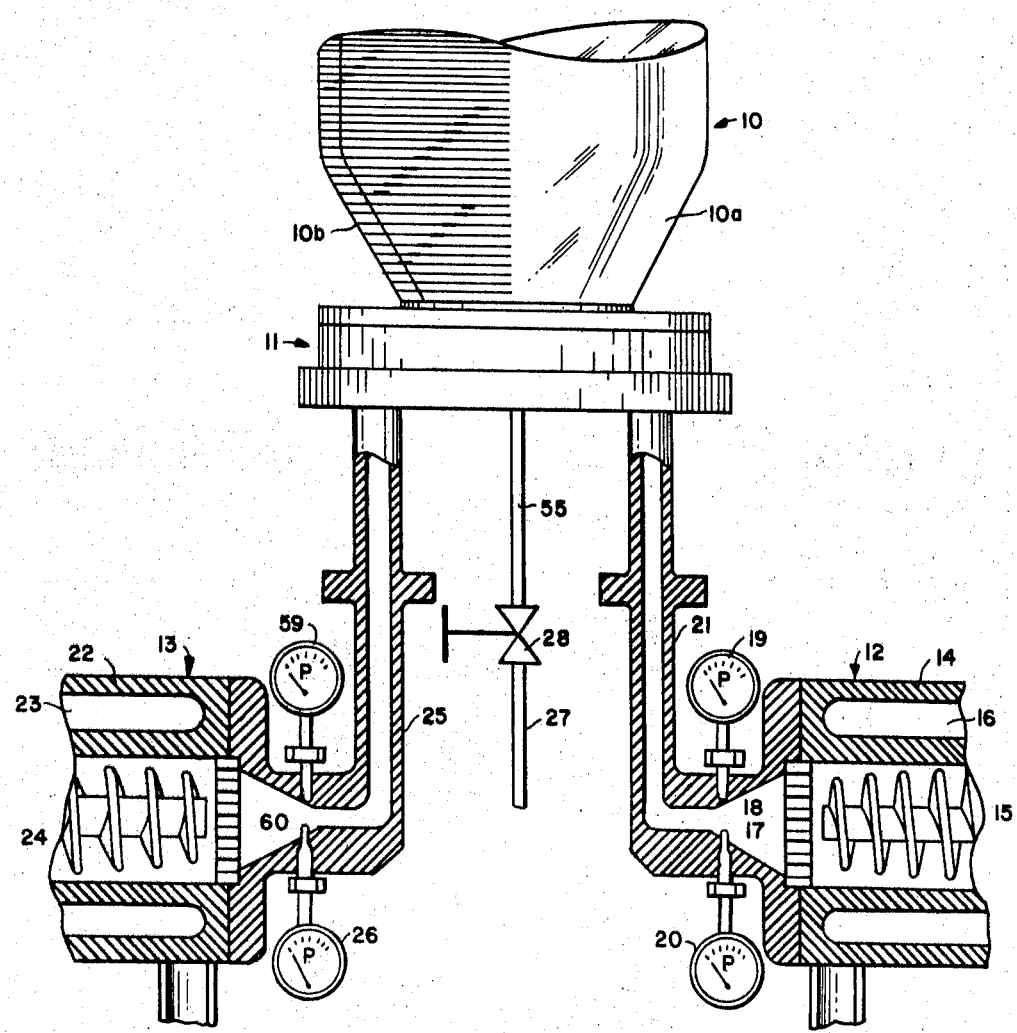
FIG. 1 is an elevational view of an exemplary apparatus for carrying out the present invention.

Referring now to FIG. 1, the tubular thermoplastic film of the present invention, designated by the reference numeral 10 generally, has one longitudinally extending portion of its wall area which is made from transparent plastic material 10a. A second longitudinally extending wall portion is formed from a colored or opaque plastic material 10b. The tubular thermoplastic film is integrally formed and is extruded from a cylindrical die 11. A first extruder, designated by the numeral 12 generally, feeds the transparent thermoplastic material to one section of the die 11. A second extruder, designated generally by the reference numeral 13, feeds the molten colored or opaque thermoplastic material to the second portion of the die 11.

The first extruder includes a barrel 14 and a screw 15 for compacting and advancing the molten thermoplastic material. The barrel 14 is provided with a chamber 16 through which is circulated steam or hot oil or other suitable heat exchange media for melting the thermoplastic material as it is advanced by screw 15. The first extruder is equipped with a breaker plate 17 provided with a plurality of small openings 18 which homogenize the molten plastic as it is driven forward by the screw 15. The pressure of the molten plastic is measured by gauge 19 and the temperature by gauge 20. A conduit 21 connects the first extruder 12 to the die 11.

The second extruder 13 includes a barrel 22 provided with chamber 23 through which hot oil, steam or other heating media may be circulated. A screw 24 within the barrel 22 drives the molten resin through breaker plate 60 and into conduit 25. This conduit supplies the molten colored or opaque thermoplastic material to the section of the extrusion die 11 not occupied by the clear thermoplastic material. A pressure gauge 59 and a temperature gauge 26 indicate the temperature and pressure of the molten resin being fed from extruder 13.

It will be understood that a hopper or feed chamber, not shown, is provided for the first extruder 12 and the second extruder 13 in order to provide a continuous supply of thermoplastic solid feed material for these extruders.

A conduit 27 having a valve 28 therein is connected to the bottom of die 11. This conduit supplies air for inflating the blown tubing 10. A pair of nip rollers (not shown) flattens the tubular film and traps the air bubble between the rollers and the die 11. Suitable pressure regulating means, not shown, are provided to give the proper expansion to the extruded tube of plastic material 10. While the tube 10 is illustrated as being expanded by the air bubble to biaxially orient the film, it is to be understood that the film of the present invention may be produced without orienting, i.e. without expanding the tube after it leaves the die 11.

Figure 2:
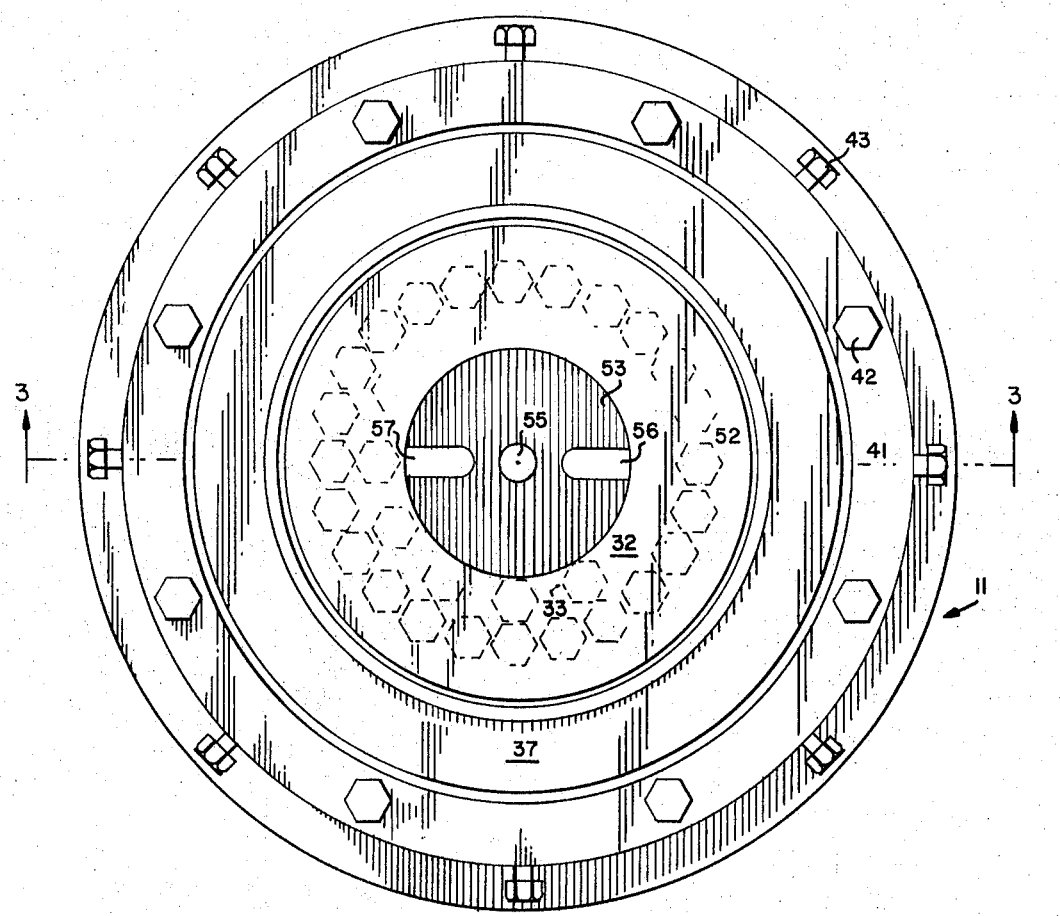
FIG. 2 is a plan view of the novel die of the present invention.
Figure 3:
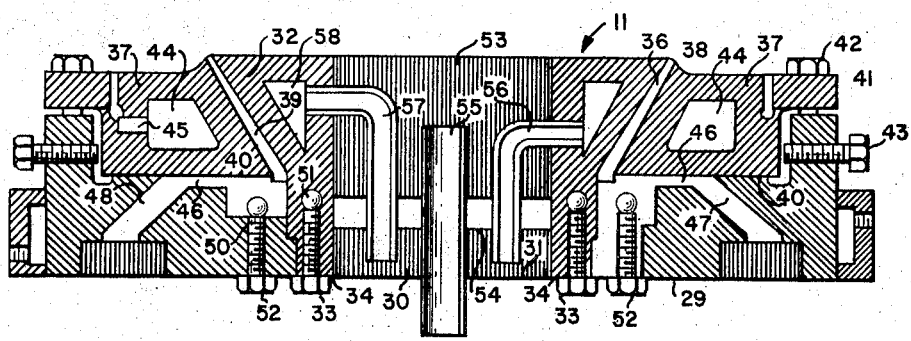
FIG. 3 is a cross-sectional view taken along line 3—3 of FIG. 2.

Referring now to FIGS. 2 and 3, the novel die of the present invention includes a cylindrical base plate 29. The base plate is provided with a central opening 30. An annular shoulder 31 is provided in the upper surface of the base plate adjacent the opening 30. The lower end of a hollow cylindrical core 32 abuts the shoulder 31 and is connected to the base plate 29 by means of bolts 33 projecting through openings 34 provided in the base plate. The outer wall surface of the cylindrical core 32 includes a lower portion 35 which has a vertically extending outer wall and an upper outer wall portion 36 which is outwardly inclined. A forming ring 37 surrounds the upper portion of the cylindrical core 32 and has one face 38 angularly inclined outwardly and positioned opposite the face 36 of the core 32. The opposed faces provide a cylindrical, outwardly diverging, tapered passage 39 through which the molten thermoplastic is extruded. However, if desired the passage 39 may be straight or converging. The forming ring 37 seats on an annular shoulder 40 on the upper surface of the base plate 29. Clamping ring 41 presses the forming ring 37 firmly against the shoulder 40. The clamping ring is connected to base plate 29 by means of bolts 42. Bolts 43 are threaded through the side of the base plate 29 and engage the outer wall of the forming ring 37. The bolts 43 are provided to make lateral adjustments to the forming ring 37 in order to provide a uniform opening throughout the annular space defined by the lip portions of the cylindrical core 32 and the forming ring 37. An annular chamber 44 is provided within the forming ring 37 through which a heat exchange medium may be circulated using port 45 for the inlet and a second port (not shown) for the outlet.

The shoulder 40 in the base plate 29 holds the bottom surface of the forming ring 37 above the opposite surface of base plate 29 thereby to provide a ring-shaped chamber 46 which communicates with the tapered passage 39. A first opening 47 is provided through the base plate 29 communicating the chamber 46 with the conduit 21 (see FIG. 1). The clear molten thermoplastic material from the first extruder 12 enters the die through opening 47. A second opening 48 is provided in the base plate at a position exactly 180° from the first opening 47. The second opening 48 provides means for admission of the colored or opaque molten thermoplastic material from the second extruder 13. A flow control ring 49 is mounted in a recess 50 provided in the base plate 29. A pair of O-rings 51—51 seals the flow control ring to the base plate and to the cylindrical core. A series of push bolts 52 are threadedly received in openings provided in the base plate 29 and have their ends abutting the lower surface of the flow control ring 49. Alternately arranged pull bolts 52a extend through openings provided in the base plate and have their ends threadedly engaging the flow control ring 49. Push bolts 52 and pull bolts 52a are used to position the height of the control ring thereby to control the flow of thermoplastic material from chamber 46 to the tapered passage 39.

The cylindrical opening 53 in the cylindrical core 32 contains a wall 54. A conduit 55 extends through the wall 54. This conduit is connected to conduit 27 which supplies air to inflate the tube of thermoplastic material. Inlet conduit 56 and outlet conduit 57 pass through the wall 54 and connect to threaded opening provided in the inner wall of the core 32 to supply heat transfer medium to the annular chamber 58 provided in the cylindrical core 32.

Figure 5:
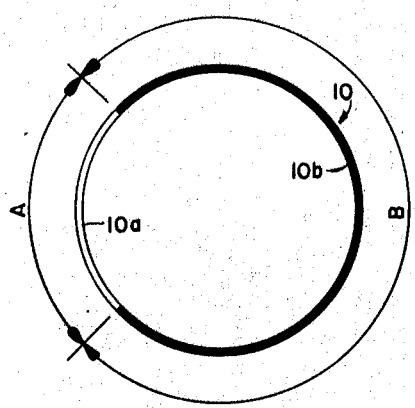
FIG. 5 is a cross-sectional view taken along the line 5—5 of FIG. 4.
Figure 4:
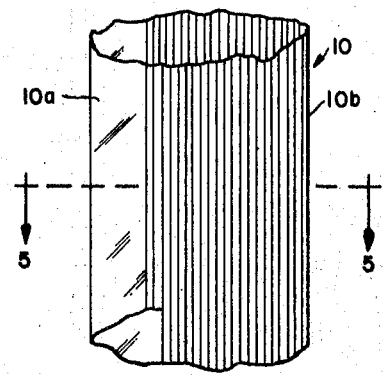
FIG. 4 is a perspective view of a section of an exemplary form of blown tubing of the present invention.

In operation a transparent, unpigmented resin is fed to extruder 12 and heat supplied to the barrel of the extruder to melt the resin. The molten resin is then moved into the die 11 by means of screw 15. At the same time a pigmented or colored resin is melted and fed by extruder 13 through conduit 25 into a second portion of the die 11. The temperature and pressure of the molten resins being extruded from first extruder 12 and the second extruder 13 is controlled and coordinated to provide the desired amount of each of the respective thermoplastic materials to the die 11. The molten thermoplastic material extrudes from the lips of the die 11, as seen in FIG. 1, to provide an integrally formed tube of thermoplastic material having a wall portion 10a of transparent material and a wall portion 10b of colored or opaque material. As seen in FIGS. 4 and 5, the transparent and colored or opaque portions of the wall area of the blown thermoplastic film may be varied to suit the particular end use of the film. The width A of the transparent area 10a may be controlled by balancing the plastic melt condition between the first and second extruders. This will also set the width B of the colored area 10b. Once the proper width is provided for the transparent material 10a, the respective pressures and temperatures are maintained within close limits in order to maintain a consistent width for the transparent material. It is understood that the colored and transparent areas may be the reverse of that described above, i.e. the major area may be transparent with a narrow colored band extending longitudinally. If desired, the area 10a may be of one color and the area of 10 b of another color. In order to provide sharp weld lines where the areas of film join, the melt indexes of the two resins used for feed material should be substantially the same.

The objects of this invention were accomplished by separately heating a cear polyethylene resin and a colored polyethylene resin in separate extruders. The molten polyethylene from each extruder was fed into a portion of a cylindrical die. The dimensional relationship between the colored and the clear sections of the extruded tubing was obtained by proper control of the melt flow from each extruder. The following examples illustrate the practice of the present invention.

EXAMPLE I

A clear polyethylene resin was loaded in the hopper of one extruding apparatus. The extruder had a barrel diameter of 2½ inches, a temperature of 298°F at the resin inlet, 365°F at the mid portion, and 365°F at the outlet end. The feedscrew was operated at 60 rpm. The second extruder hopper was loaded with a colored polyethylene resin. This extruder had a barrel diameter of 1½ inches, a temperature of 300°F at the resin inlet, at the mid point and at the resin outlet. The feedscrew was operated at 52 rpm. The separate streams of molten resins were fed to a cylindrical die maintained at 300°F and extruded as a thin wall tube. The tube was inflated to produce the desired thickness film. The flow of the two streams of resin was adjusted to give a tube having a clear longitudinally extending panel in an otherwise colored tube. The clear panel had good width control and the weld lines joining the clear and colored areas were sharply defined.

EXAMPLE II

The same procedure was used as in Example I except that the 6 inch barrel diameter extruder used for the clear polyethylene resin was operated at a barrel temperature of 395°F at the inlet, mid point, and outlet and the feedscrew was operated at 40 rpm. The 2½ inch barrel diameter extruder used for the colored resin was operated at an inlet temperature of 300°F, a mid point temperature of 366°F, and an outlet temperature of 400°F, with a feedscrew speed of 6 rpm. A die temperature of 400°F was used. The flow of the two streams of resins to the die were adjusted to produce a polyethylene tubing with the major portion of its wall area consisting of clear resin and having a narrow colored strip extending longitudinally in the tubing. The tubing was slit to make sheeting with the colored strip in the center of the sheeting. The sheeting had a thickness of 0.002 inch.

The tubing prepared in Example I is admirably suited for conversion into garment bags. The tubing prepared in Example II finds ready use as a sheeting for conversion into automobile seat covers which have the colored strip in the center of the seat.

The tubular film of the present invention may be made from any thermoplastic material capable of being extruded from a circular die, for example, polyethylene, polypropylene, polyethylene terephthalate, polyvinyl chloride homo- and copolymers, cellulose acetate and others.

The films of the present invention are particularly useful for making plastic covers used by the dry cleaning industry to cover wearing apparel. It is also well suited for use in making bags, sacks, and other containers for packaging a wide variety of goods such as shirts, dresses, socks, and other soft goods. It can also be used for packaging food items.

What is claimed is:

1. A die for melt-extruding tubular thermoplastic film comprising:
   a. a cylindrical base plate having a central opening therein;
   b. a hollow cylindrical core section concentrically removably mounted in the central opening of said base section, said core section having an annular outer wall including a lower cylindrical outer wall portion seated on and projecting above the upper surface of said base plate and an upper, outwardly inclined, outer wall portion attached to said lower cylindrical outer wall portion;
   c. a forming ring section removably mounted on the upper surface of said base section and surrounding said annular outer wall of said core section, said forming ring section having a bottom wall and an outwardly inclined, annular inner wall which is spaced from said upper, outwardly inclined, outer wall portion of said core section to define a conical passage terminating in a die orifice for extrusion of said tubular thermoplastic material;
   d. said base plate having a ring-shaped recess in its upper surface opposite and spaced from said bottom wall of said forming ring to provide a ring-shaped chamber which joins said conical passage at its lower end;
   e. a flow control ring movably mounted in said ring-shaped chamber and adapted to be positioned to change the height of said ring-shaped chamber at its juncture with the lower end of said conical passage; and
   f. said base plate being provided with two inlet ports spaced about 180° apart, which ports communicate with said ring-shaped chamber whereby separate streams of molten thermoplastic material may be simultaneously fed to said die.

* * * * *